Figure 1:
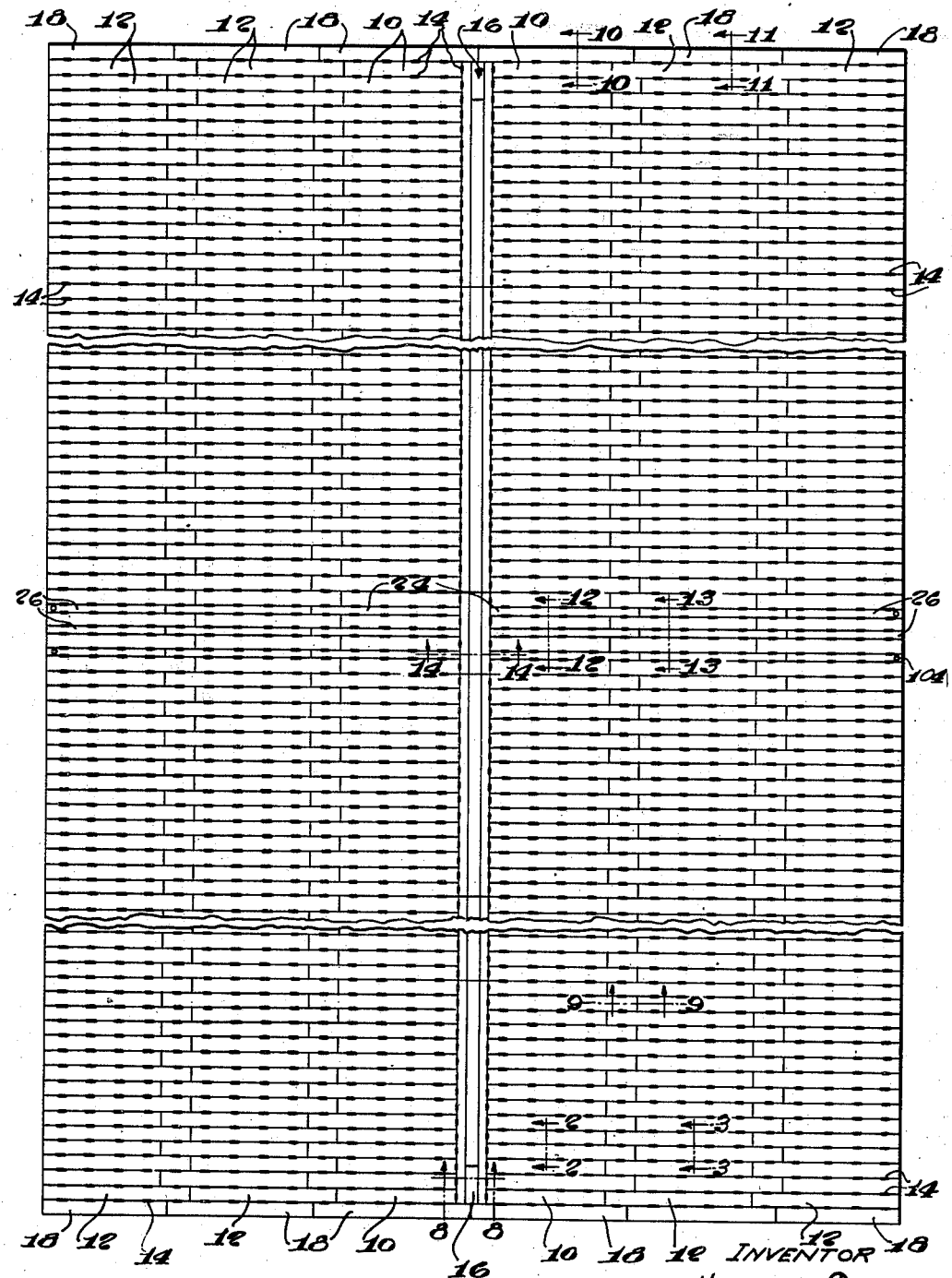

Sept. 3, 1946.  H. H. CRAFTON  2,407,059
PORTABLE LAUNCHING AND LANDING MAT FOR AIRPLANES
Filed Sept. 29, 1943  4 Sheets-Sheet 1

INVENTOR
Henry H. Crafton
BY J. Stanley Churchill
ATTORNEY

Sept. 3, 1946.  H. H. CRAFTON  2,407,059
PORTABLE LAUNCHING AND LANDING MAT FOR AIRPLANES
Filed Sept. 29, 1943  4 Sheets-Sheet 2
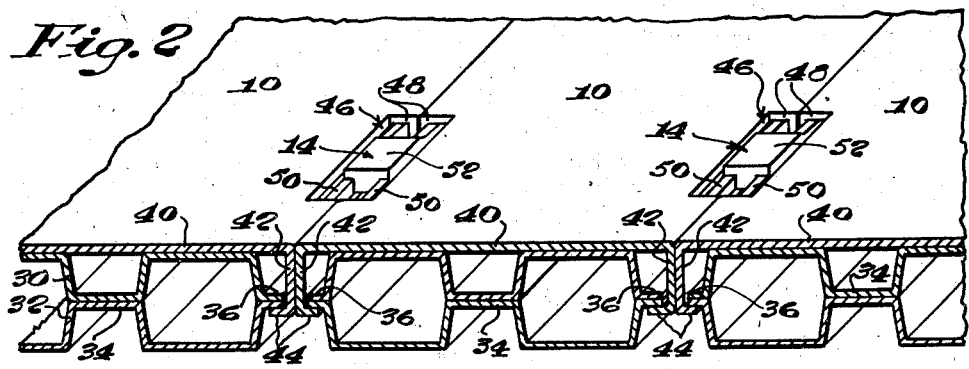
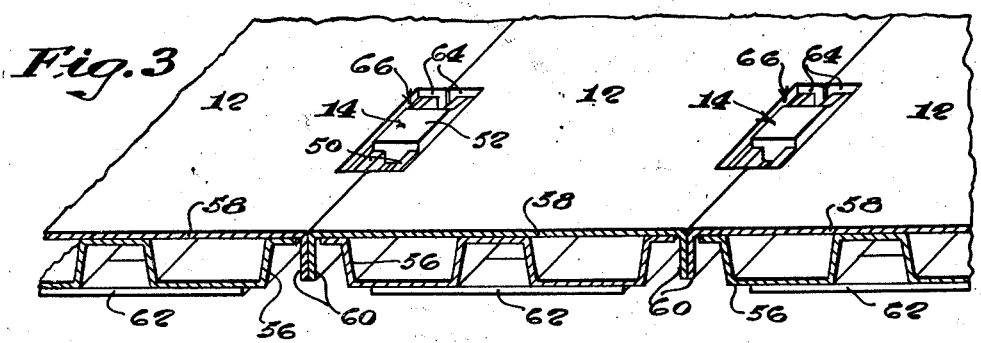
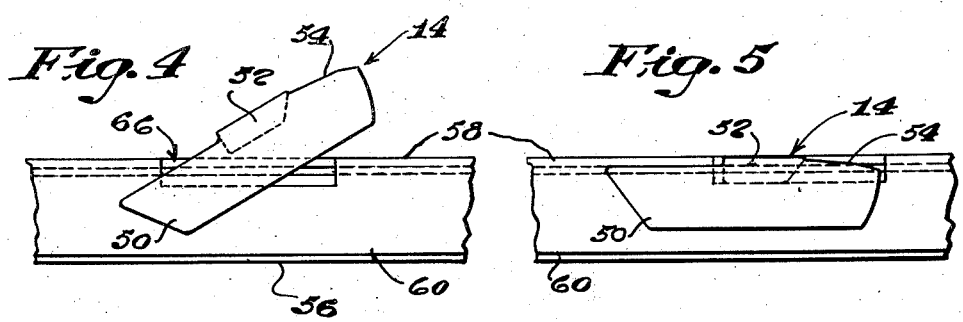
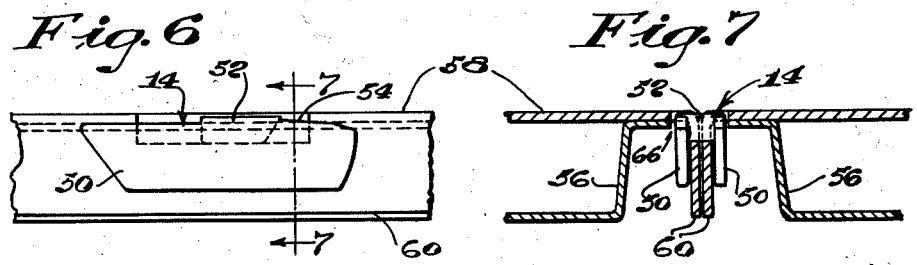
INVENTOR
Henry H. Crafton
BY J. Stanley Churchill
ATTORNEY

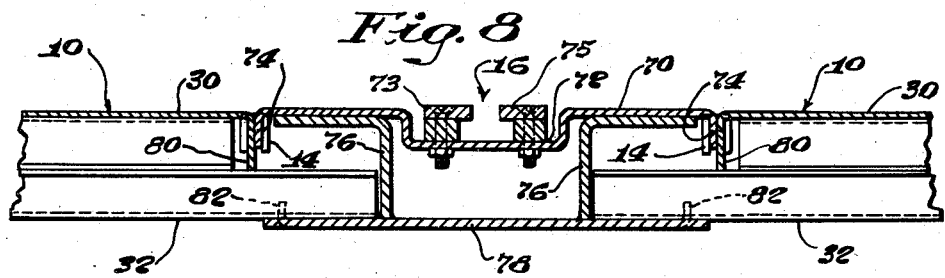
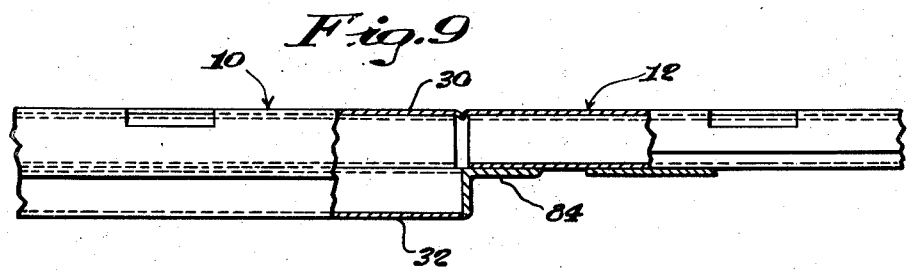
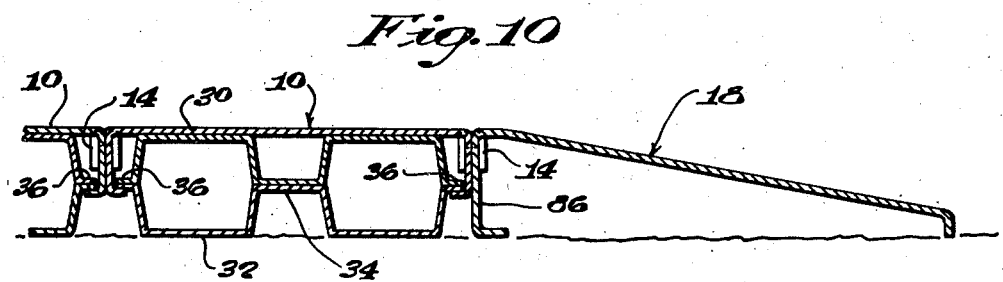
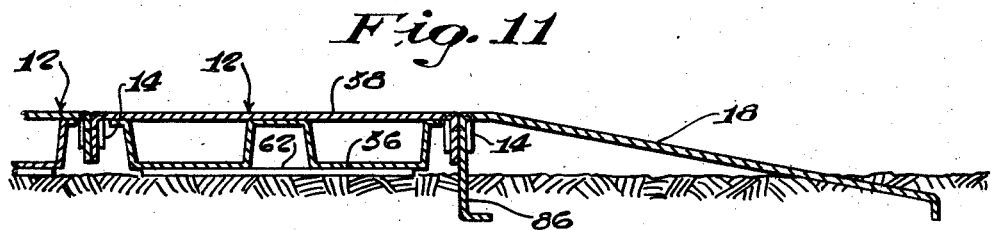

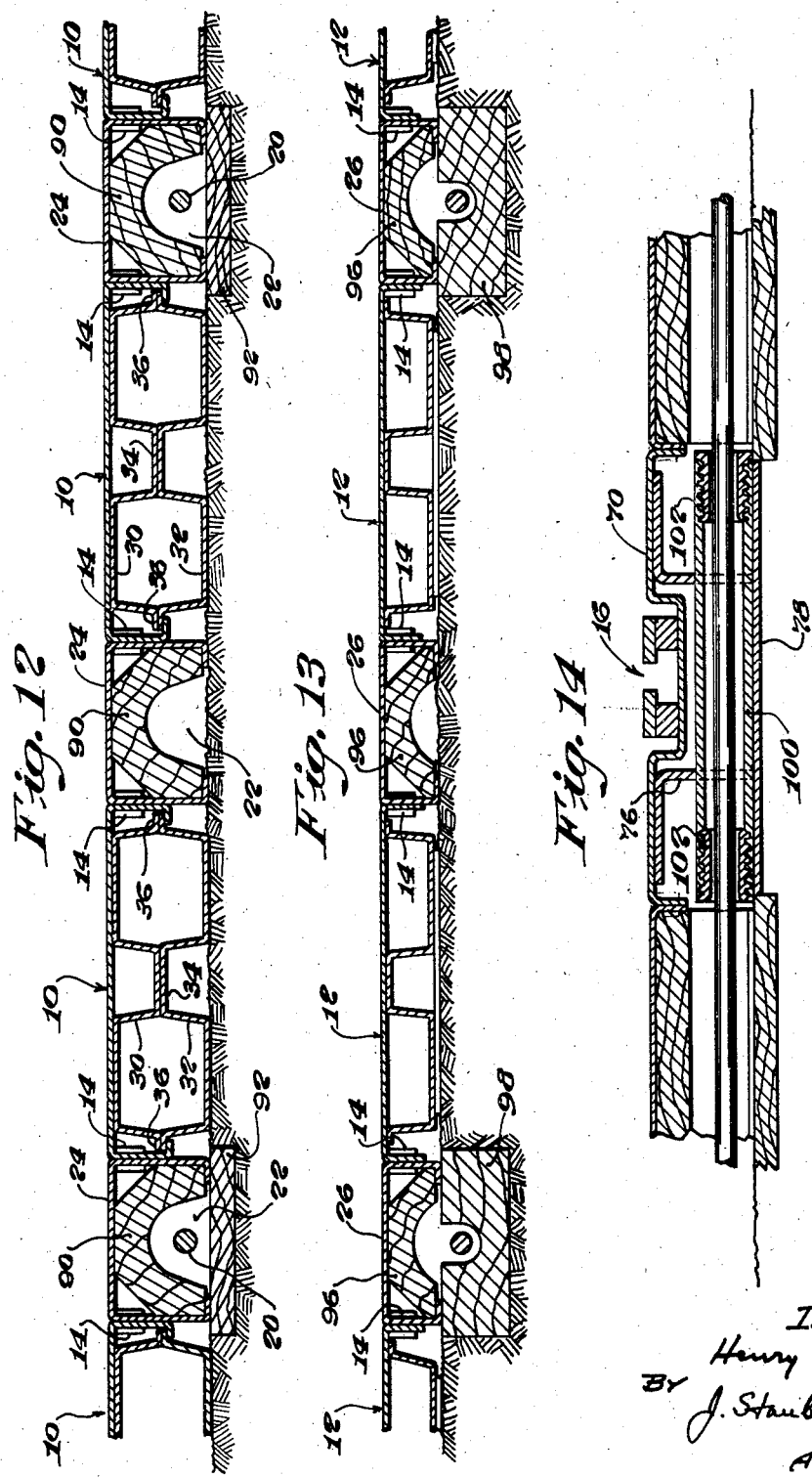

Patented Sept. 3, 1946

2,407,059

UNITED STATES PATENT OFFICE 2,407,059

PORTABLE LAUNCHING AND LANDING MAT FOR AIRPLANES

Henry H. Crafton, Baden, Pa., assignor to H. H. Robertson Company, Pittsburgh, Pa., a corporation of Pennsylvania Application September 29, 1943, Serial No. 504,290

14 Claims. (Cl. 94—13)

This invention relates to a portable launching and landing mat for airplanes.

The invention has for an object to provide a novel and improved launching and landing mat of the character specified which is made up of a plurality of strong but light weight individual multicellular sections or units detachably joined together to form a mat in a novel, simple and efficient manner.

A further object of the invention is to provide a novel and improved launching and landing mat of the character specified having a runway or track for catapulting purposes, and comprising a plurality of individual multicellular units detachably joined together to form the mat in such manner as to distribute to the mat the upward strain upon the track during catapulting of the plane.

With these general objects in view, and such others as may hereinafter appear, the invention consists in the launching and landing mat in the various structures, arrangements and combinations of parts hereinafter described and particularly defined in the claims at the end of this specification.

In the drawings illustrating the preferred embodiment of the invention, Fig. 1 is a plan view of a launching and landing mat embodying the present invention; Fig. 2 is a perspective view as viewed in cross section taken on the line 2—2 of Fig. 1 and illustrating the individual units forming one portion of the mat; Fig. 3 is a similar view, the section being taken on the line 3—3 of Fig. 1 and illustrates individual units forming a different portion of the mat; Fig. 4 is a side elevation, partly in cross section, illustrating a locking member and the manner of applying the same to join the individual units together; Figs. 5 and 6 are similar views, Fig. 5 showing the locking member in its inserted position, and Fig. 6 showing the member in its locked position; Fig. 7 is an end view in cross section taken on the line 7—7 of Fig. 6; Fig. 8 is a cross sectional view on the line 8—8 of Fig. 1 illustrating the manner of joining the catapulting track to the multicellular units; Fig. 9 is a side elevation partly in cross section as viewed from the line 9—9 of Fig. 1 showing the manner of joining endwise the two different types of multicellular units preferably employed in constructing the present mat; Fig. 10 is a cross sectional view on the line 10—10 of Fig. 1, showing an apron attached to an edge of the mat; Fig. 11 is a similar view, the section being taken on the line 11—11 of Fig. 1 and showing a portion of an apron below the ground line for use with a different multicellular unit; Fig. 12 is a cross sectional view on the line 12—12 of Fig. 1 illustrating cable ducts embodied in the present mat; Fig. 13 is a cross section on the line 13—13 of Fig. 1 showing the cable ducts in a different portion of the mat; and Fig. 14 is a cross section on the line 14—14 of Fig. 1 showing that portion of the cable duct passing beneath the catapulting track.

In general, the present invention contemplates a novel launching and landing mat for airplanes designed to be rapidly laid down on any substantially flat ground space, and which is made up of a plurality of individual multicellular units, and with means for fastening together the units in a novel manner whereby to permit the mat to be quickly and expeditiously erected and taken up. The present mat is also constructed and arranged so as to be capable of withstanding a relatively large upward pull to enable planes to be catapulted therefrom.

Referring now to the drawings, in general, and as shown in Fig. 1, the present launching and landing strip or mat comprises a plurality of individual cellular metal units indicated generally at 10 and 12 and which may be joined together at spaced intervals by locking members or clips 14 to form a unitary structure upon which airplanes may land and from which they may take off. As herein shown, the present mat is provided with a catapulting track 16 running longitudinally of and through the center of the mat and being similarly joined to the cellular metal units by the locking clips 14. Each end of the landing strip is provided with an apron made up of sections 18 which may and preferably will be joined to the units 10 and 12 by the locking clips 14. Provision is also made for running cables 20 transversely of the mat in channels 22 formed by auxiliary sections 24 and 26.

Referring now particularly to Figs. 2 and 3, which illustrate the two different types of multicellular units 10 and 12, respectively, making up the body of the landing strip, each unit 10, see Fig. 2, comprises upper and lower corrugated sheet metal members 30, 32 joined together by welding at the web portions 34, 36 to form a cellular metal structure of the general type disclosed in the United States patent to Young, No. 1,867,433. As herein shown, each cellular metal unit 10 is provided with a top plate 40, preferably of a heavier gage metal than the corrugated members 30, 32, the plate extending across the top of the corrugated unit and having side walls 42 extending downwardly. The lower ends of the side walls may be bent inwardly as shown to form shelves 44 upon which the web portions 36 may be received. The top plates 40 may be welded or otherwise attached to the cellular metal units to form integral mat sections.

The cellular metal units 12, as shown in Fig. 3, each comprise a corrugated sheet metal member 56 provided with a top plate 58 having depending side wall portions 60. The units 12 are further provided with transverse bottom straps 62 joining the bottom webs of the corrugations at spaced intervals along the length of the unit. The top plates 58 and bottom straps 62 may and preferably will be welded to the corrugated metal members 56 to form integral mat sections.

Provision is made for quickly and conveniently joining adjacent units 10 or 12 to form the body portion of the landing mat, and, as best shown in Figs. 2 to 7, the locking member 14 is arranged to be inserted in openings 46 formed by cutouts 48 in adjacent members 10, as shown in Fig. 2, or, in openings 66 formed by cutouts 64 in adjacent members 12, as shown in Fig. 3. The openings 46, 66 expose the side walls 42, 60 of adjacent units 10 and 12 respectively and the locking clips 14 are provided with parallel arms 50 arranged to embrace the adjacent side walls, the arms 50 being formed integrally with and extended from a tie piece 52. As shown in Figs. 4 to 6, the length of the clip 14 is substantially greater than the length of the opening; and, the depth of the cutout is sufficient to permit the tie piece 52 to be set below the upper surface of the top plate 40 or 58 or to be substantially flush therewith.

The first step in applying the locking member 14 in operative position, as illustrated in Fig. 4, is to insert the member at an angular position, the arms 50 embracing the side walls 60. The locking clip is then moved to the left, viewing Fig. 4, in order to project the arms 50 under the adjacent portion of the top plate and permitting the opposite end of the clip to drop down into the opening as shown in Fig. 5. The locking clip is then forced to the right, viewing Fig. 6, to engage a wedging surface 54 of the locking clip with the under side of the opening in order to lock the clip in position.

Referring now to Figs. 1 and 8, the catapulting track indicated generally at 16 is supported in an auxiliary member comprising a top plate 70 having a depressed portion 72 to which the track members 73, 75 are attached, and depending side wall portions 74. The top plate 70 is provided with angle members 76 welded thereto and an elongated bottom plate 78 is welded to the ends of the angle members 76 as clearly shown in Fig. 8. As shown in Fig. 1, the track section extends at right angles to the cellular metal units 10 and in order to tie the ends of the units 10 to the track section similar cutouts are provided in abutting portions of the track section and the cellular units to form an opening for receiving a locking clip 14 to embrace the side walls 74 and depending end walls 80 forming part of the units 10. As shown in Fig. 8, the lower member 32 of the unit 10 extends beyond the upper member 30 to rest on the sides of the bottom plate 78, and upright lugs 82 formed by bending up portions along the edge of the plate 78 are arranged to be received in openings formed in the bottom of the members 32.

From the description thus far it will be observed that the catapulting track section 16 running through the center of the mat is connected to a course of units 10 on either side. Beyond the units 10 on either side two courses of units 12 are provided, and, as illustrated in Fig. 9, in order to connect the units 10 to the units 12 in abutting relationship to form a flush upper surface, each unit 10 is provided with an angle member 84 welded thereto and forming a shelf upon which one end of the member 12 may rest.

In order to lock adjacent units 10 and 12 together, adjacent members 10 vary in length to obtain a staggered end formation, the members 12 being locked between alternate members 10 by locking clips 14, as best shown in Fig. 1. The next course of units 12 are similarly locked in staggered formation, the outer course of units 12 varying in length and being assembled end to end with the adjacent course and locked between alternate units 12 of the second or intermediate course.

As illustrated in Figs. 10 and 11 an apron 18 is provided at each end of the mat or strip which is made up in sections of convenient length, as shown in Fig. 1. Each apron section is provided with a vertical wall 86 provided with suitable cutout portions to form with the adjacent cellular metal units openings into which the locking members 14 are inserted to securely attach the aprons thereto. The aprons 18 are preferably of a height equal to the mat units 10 and where used adjacent the units 12, a portion of the apron may be buried in the ground, as shown in Fig. 11.

Provision is made for running cables 20 transversely of the mat and as illustrated in Fig. 12 a plurality of auxiliary sections 24 of inverted U-shape may be provided to form channels 22 in which wooden inserts 90 may be placed as shown. A wooden plank 92 may also be provided under the cable sections 24, the planks being set below the ground line, as shown. The cable sections 24 are of the same height as the adjacent cellular units 10 between which they run and to which they are attached by the locking clips 14. Fig. 13 illustrates cable sections 26 arranged to form continuations of cable sections 24 and being of a height so as to provide a flush surface with the adjacent cellular metal units 12. A wooden insert 96 is provided within the section 26 and a grooved plank 98 may be set under each section beneath the ground line, as shown.

The cable sections are disposed approximately through the center of the mat and parallel to the runway sections 12 to which they may be attached by the locking clips 14. As illustrated in Fig. 14, where the cable passes under the track section 16 a length of pipe 100 is provided which may be welded to the bottom plate 78 and which is provided with bushings 102 threaded into either end of the pipe. Openings 104 in the upper ends of the cable sections, as shown in Fig. 1, may be provided for an arresting cable support, not shown.

The cellular metal units may be made of any convenient size, in practice being approximately one foot wide and varying in length from nine to twelve feet to provide the staggered formation. Thus, each section may be conveniently handled by one or two men to enable the mat to be set up in operative position in a minimum of time.

After the individual units have been laid down and locked together in the manner above described, it will be observed that a structurally united mat is formed having sufficient strength to withstand the impact of planes landing thereon and in addition the integrated structure is such as to distribute the stresses set up during catapulting of planes when taking off. The cellular structure of the individual units and the manner in which they are locked together, enables the individual units to be constructed light in weight but of substantial strength and to enable the mat to be quickly laid down and subsequently taken up.

While the preferred embodiment of the invention has been herein illustrated and described it will be understood that the invention may be embodied in other forms within the scope of the following claims.

Having thus described the invention, what is claimed is:

1. An aircraft launching and landing mat comprising a plurality of individual cellular metal units laid side by side in contiguous relation with their upper surfaces in substantially one plane and provided with marginal side walls depending from their upper surfaces, the adjacent upright walls of the end cells of contiguous units being spaced from the marginal edges to form a channel into which said side walls depend, said units being provided with cutout portions at selected spaced intervals arranged to form aligned openings exposing said channel and the side walls of contiguous units, and a plurality of detachable clamping members arranged to extend into said channel through said opening and to engage said side walls to prevent lateral displacement of one unit relative to another, said clamping members having portions engageable with the under side of said upper surfaces to prevent vertical displacement of one unit relative to another.

2. An aircraft launching and landing mat comprising a plurality of individual cellular metal units laid side by side in contiguous relation with their upper surfaces in substantially one plane and provided with marginal side walls depending from their upper surfaces, the adjacent upright walls of the end cells of contiguous units being spaced from the marginal edges to form a channel into which said side walls depend, said units being provided with cutout portions at selected spaced intervals arranged to form aligned openings exposing said channel and the side walls of contiguous units, and a plurality of detachable clamping members arranged to extend into said channel through said opening and to engage said side walls to lock said units together, said clamping members being of greater length than said opening and arranged to extend under the upper surfaces of the units to prevent vertical displacement of one unit relative to another.

3. An aircraft launching and landing mat comprising a plurality of individual cellular metal units laid side by side with their upper surfaces in substantially one plane and provided with side walls depending from their upper surfaces, said units being provided with cutout portions at selected spaced intervals arranged to form aligned openings exposing the side walls of contiguous units, and a plurality of detachable clamping members adapted to be inserted through said openings and arranged to engage said side walls to lock said units together, portions of said clamping members being wedge shaped and arranged to extend under the upper surfaces of adjacent units and to be wedged between the latter and portions of said side walls.

4. An aircraft launching and landing mat comprising a plurality of courses each course comprising a plurality of individual cellular metal units laid side by side with their upper surfaces in substantially one plane and provided with side and end walls depending from their upper surfaces, detachable means engageable with adjacent side walls and with the under side of said upper surfaces to lock said units together, a track supporting unit having depending side walls and extending longitudinally of the mat between two courses of said cellular units, the latter being disposed at right angles to said track unit, and detachable means engageable with the depending side walls of said track unit and the end walls of said cellular units to lock the same together.

5. An aircraft launching and landing mat comprising a plurality of individual cellular metal units laid side by side with their upper surfaces in substantially one plane and provided with side walls depending from their upper surfaces, one or more cable ducts extending transversely of the mat and parallel to said cellular units and disposed between adjacent units, said cable ducts having their upper surfaces in substantially the same plane as said cellular units and provided with side walls depending from their upper surfaces, and means for detachably connecting said units and said ducts comprising a plurality of clamping members arranged to embrace the side walls of adjacent units and to engage the under side of said upper surfaces to lock the same together.

6. An aircraft launching and landing mat comprising a plurality of courses, each course comprising a plurality of individual cellular metal units laid side by side, a track supporting plate extending longitudinally of the mat and between two courses of said cellular units, at least one cable duct extending transversely of the mat parallel to said cellular units and disposed between two of said units, all of said members having their upper surfaces in substantially one plane and provided with walls depending from their upper surfaces, and means for detachably connecting said members comprising a plurality of locking clips arranged to embrace the side walls of adjacent members and to engage the under side of said upper surfaces to lock the same together.

7. An aircraft launching and landing mat comprising a plurality of individual cellular metal units laid side by side and detachably secured together, each of said cellular metal units including an upper and a lower corrugated sheet metal member joined together at their web portions to form hollow load supporting sections, and an elongated plate extending across and secured to the top of the corrugated sections to form an integral mat section, said plate being provided with downwardly extended side walls having their lower ends bent inwardly and in engagement with the underside of the exterior web portions.

8. An aircraft launching and landing mat, comprising: a plurality of individual cellular metal units having flat upper surfaces and side walls depending from said upper surfaces, said units being arranged so that said side walls are in adjacent, side by side relationship; and a plurality of clamp members engaging said adjacent side walls at spaced intervals, each of said clamping members including an inverted U-shaped portion engaging said side walls to prevent lateral displacement of one of said units with respect to another, and parts engaging the under side of the flat upper surfaces, the loop of said U-shaped portion extending through said adjacent depending side walls so as to cooperate with said parts engaging the under side of the flat upper surfaces and prevent vertical displacement of one unit with respect to an adjacent unit in both directions.

9. An aircraft launching and landing mat, comprising: a plurality of courses in substantially parallel relationship, each of said courses comprising individual cellular metal units having flat upper surfaces and side walls depending from said upper surfaces, said units being arranged in transverse alignment so that said side walls are in adjacent side by side relationship; a plurality of clamp members engaging said adjacent side walls at spaced intervals, each of said clamping members including an inverted U-shaped portion engaging said side walls to prevent lateral displacement of one of said units with respect to another, and parts engaging the under side of the flat upper surfaces, the loop of said U-shaped portion extending through said adjacent depending side walls so as to cooperate with said parts engaging the under side of the flat upper surfaces and prevent vertical displacement of one unit with respect to an adjacent unit in both directions; and a track supporting unit extending between two of said courses for substantially the entire length thereof.

10. An aircraft launching and landing mat, comprising: a plurality of courses in substantially parallel relationship, said courses comprising individual metal units having flat upper surfaces and side walls depending from said upper surfaces, said metal units arranged in transverse alignment with said walls in adjacent side by side relationship forming substantially parallel rows with the adjacent ends of the units of any given row staggered with respect to the ends of the units of the rows adjacent thereto; and clamp members engaging said adjacent side walls at spaced intervals, each of said clamping members including an inverted U-shaped portion engaging said side walls to prevent lateral displacement of one of said units with respect to another, and parts engaging the under side of the flat upper surfaces, the loop of said U-shaped portion extending through said adjacent depending side walls so as to cooperate with said parts engaging the under side of the flat upper surfaces and prevent vertical displacement of one unit with respect to an adjacent unit in both directions, and to lock together said courses to form an integral structure.

11. An aircraft launching and landing mat, according to claim 8, including a sloping ground engaging apron secured to at least one of the ends thereof.

12. An aircraft launching and landing mat, comprising: a plurality of individual cellular metal units having flat upper surfaces and side walls depending from said upper surfaces, said units being arranged so that said walls are in adjacent, side by side relationship, each of said cellular metal units including upper and lower corrugated sheet metal members joined together at their web portions to form hollow load supporting sections; and a plurality of clamp members engaging said adjacent side walls at spaced intervals, each of said clamping members including an inverted U-shaped portion engaging said side walls to prevent lateral displacement of one of said units with respect to another, and parts engaging the under side of the flat upper surfaces, the loop of said U-shaped portion extending through said adjacent depending side walls so as to cooperate with said parts engaging the under side of the flat upper surfaces and prevent vertical displacement of one unit with respect to an adjacent unit in both directions.

13. An aircraft launching and landing mat, comprising: a plurality of individual cellular metal units having flat upper surfaces and side walls depending from said upper surfaces, said units being arranged so that said side walls are in adjacent, side by side relationship, each of said cellular metal units including a corrugated sheet metal member secured to said upper surfaces, and a plurality of transversely extended straps secured at spaced intervals to the bottom of said corrugated member; and a plurality of clamp members engaging said adjacent side walls at spaced intervals, each of said clamping members including an inverted U-shaped portion engaging said side walls to prevent lateral displacement of one of said units with respect to another, and parts engaging the under side of the flat upper surfaces, the loop of said U-shaped portion extending through said adjacent depending side walls so as to cooperate with said parts engaging the under side of the flat upper surfaces and prevent vertical displacement of one unit with respect to an adjacent unit in both directions.

14. An aircraft launching and landing mat, comprising, a plurality of courses in substantially parallel relationship, said courses comprising a plurality of individual cellular units having flat upper surfaces and side walls depending from said upper surfaces, said units being arranged so that said side walls are in adjacent, side by side relationship, the said cellular metal units of at least one of said courses including upper and lower corrugated sheet metal members joined together at their web portions to form hollow load supporting sections, and said cellular metal units of other of said courses, including a single corrugated sheet metal member; and a plurality of clamp members engaging said adjacent side walls at spaced intervals, each of said clamping members including an inverted U-shaped portion engaging said side walls to prevent lateral displacement of one of said units with respect to another, and parts engaging the under side of the flat upper surfaces, the loop of said U-shaped portion extending through said adjacent depending side walls so as to cooperate with said parts engaging the under side of the flat upper surfaces and prevent vertical displacement of one unit with respect to an adjacent unit in both directions.

HENRY H. CRAFTON.